United States Patent [19]

Elson et al.

[11] 3,871,422

[45] Mar. 18, 1975

[54] DUAL BALLOON VALVE

[75] Inventors: Edward E. Elson, Anaheim; Aaron Goldsmith, Northridge, both of Calif.

[73] Assignee: Automatic Helium Balloon Systems, Inc., Beverly Hills, Calif.

[22] Filed: Feb. 14, 1973

[21] Appl. No.: 332,369

[52] U.S. Cl.................. 137/231, 251/149.1, 46/90, 141/348, 141/237
[51] Int. Cl........................................... F16k 15/20
[58] Field of Search............ 141/10, 67, 68, 98, 99, 141/100, 102, 114, 250, 285, 291, 292, 293, 301, 302, 310, 311, 312, 313–317, 348, 349, 350, 382–386, 390–392, 237; 46/90, 32; 251/149.1; 5/348–350; 137/231

[56] References Cited
UNITED STATES PATENTS
2,792,669   5/1957   Jackson ................................ 46/90

*Primary Examiner*—Houston S. Bell, Jr.
*Attorney, Agent, or Firm*—Mahoney, Schick & Cislo

[57] ABSTRACT

A dual inflatable article valve especially useful for balloons including an open ended tubular body member having at least first and second peripherally extending flanges for engagement with a first inflatable article such as a balloon, such engagement being gas tight. A third extending terminal flange is positioned on the end of the body member and is adapted for gas-tight engagement with a second inflatable article, such as a second balloon. The second balloon is generally smaller than the first balloon and is located therein.

15 Claims, 3 Drawing Figures

PATENTED MAR 18 1975　　　3,871,422

DUAL BALLOON VALVE

BACKGROUND OF THE INVENTION

Generally this invention pertains to inflatable article valves similar to the type disclosed and claimed in Elson et al. application, Ser. No. 141,711, filed May 10, 1971, now U.S. Pat. No. 3,768,501. In said application, there was disclosed and claimed a valve structure having a plurality of applications and end uses, and in particular for utilization with a balloon.

This invention is similarly related and hence said application disclosure is hereby incorporated by reference and it will be seen that the present invention pertains to a valve for utilization with a plurality of inflatable articles or balloons. That is, in the instance where it is desired to have a smaller inflated balloon inside of a larger also inflated balloon, the valve of this invention has particular applicability.

In the valve of this invention wherein at least two inflatable articles such as balloons are contemplated, a simultaneous filling of the balloons with an inflating gas such as, for example, helium, permits ultimate filling without the inner balloon bursting as has often been the case in the past. That is, the inner balloon is ordinarily smaller and hence, least likely to be adequately filled, but with the valve of this invention, because each of the two balloons are filled simultaneously, the equalization of pressure inside and outside of the smaller balloon prevents the smaller or inner balloon from bursting. Thus, this invention relates to improvements in inflatable articles, and particularly to an improved valve device for utilization with inflatable articles such as for example, balloons.

SUMMARY OF THE INVENTION

It is a principle object of the present invention to provide an improved, dual valve.

It is another object of the invention to provide an improved valve for association with a plurality of inflatable articles.

It is still another object of the present invention to provide an improved inflation valve for association with at least two inflatable articles wherein one is located inside the other and wherein simultaneous inflation of the articles is obtained.

It is a further object of the present invention to provide an improved valve mechanism for utilization with a plurality of inflatable articles wherein one of the inflatable articles is inside the other, and the inner inflatable article is inflated under equalized pressure conditions.

These and other objects of the present invention will become apparent from a reading of the following description taken in conjunction with the accompanying drawing, which are for illustrative purposes only.

In an exemplary embodiment, the invention pertains to a valve for at least two inflatable articles such as balloons comprising the combination of an open ended tubular valve body member having spaced first and second peripheral flanges, and a third terminal flange, wherein an aperture in the wall of the body member is provided intermediate said first and second flanges. At least one of said first and second flanges is adapted for gas tight association and engagement with a first inflatable article, while the third terminal flange is adapted for gas tight association engagement with a second inflatable article located within said first inflatable article. The second flange has at least one discontinuous wall section. A tubular valve slide member is provided, which is longitudinally movable within said body member, and said second inflatable article between an advanced open position and a retracted closed position and is in substantially gas tight sliding engagement with a longitudinally extending peripheral sealing area due to the coaction with the inside of said body member. The slide member is closed at its front end and open at its rear end, and has at least one port formed therein between the ends thereof which communicates with a point forwardly of said sealing area when said slide member is in the open position. Means for restricting relative movement between said body and slide members, and means for obtaining relative movement therebetween are also provided.

DESCRIPTION OF THE PREFERRED EMBODIMENTS

Figure 1:
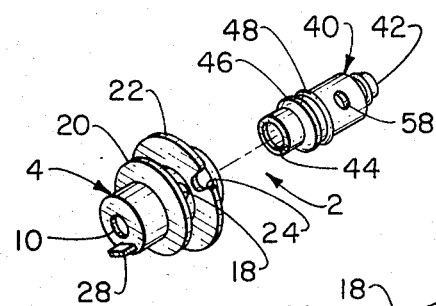
FIG. 1 is a perspective view of the two main components of the valve of this invention.

Referring to the figures of the drawing wherein like numerals of reference designate like elements throughout, it will be seen that the valve 2 comprises a body portion 4 of cylindrical tubular shape having an open end 6 forming its fore end and an aft closed end 8 having a through aperture 10 entering into the bore 12 of the valve body member 4.

It will be noted that the bore 12 at the aft end 14 is of lesser dimension than at the fore end 16, and communicates through a discontinuous wall portion 18 to the exterior of valve body member 4. The tapered configuration of interior bore 12 of body member 4 aids in obtaining effective fluid tight association with a valve slide member as will be described later. Valve body member 4 is provided with a first integral radially extending flange 20, a second spaced integral flange 22 having a discontinuous wall portion as formed by the slot 24 (although holes or other apertures may be utilized) the first and second radially extending flanges 20 and 24 respectively being positioned on either side of the discontinuous wall or aperture 18, and having a third terminal flange 26, all of said flanges being integral with valve body member 4, and in this instance, being of one-piece plastic molded construction.

It will be noted that the fore portion 6 of valve body member 4, particularly opposite the third terminal flange 26, is somewhat bulbous in order to form tight engagement with the other component of the valve structure, as will become apparent.

A tab 28 is integrally formed with the aft portion 8 by which means a length of light string 30 may be secured as by, for example, staple 32. It will be noted that a first balloon 34 and specifically the neck thereof, is engaged by spaced flanges 20 and 22 in gas tight relationship, the extreme mouth portion 36 of balloon 34 acting to retain the wound length of string 30 in the relationship shown in FIGS. 2 and 3. Obviously, the free end of the length of string 30 may be pulled to unwind the entire length of string to thereby allow the mouth portion 36 to collapse adjacent the flange 20. It will be noted that because the inflatable article 34, in this case a balloon, is elastomeric in nature, that gas tight engagement of the outer edges of flanges 20 and 22 (being of round configuration in cross-section) is obtained. It will be noted that the second flange 22 is slightly greater in radial dimension than the first flange 20, and each of the flanges 20 and 22 are greater in radial direction than the third terminal flange 26.

Figure 3:
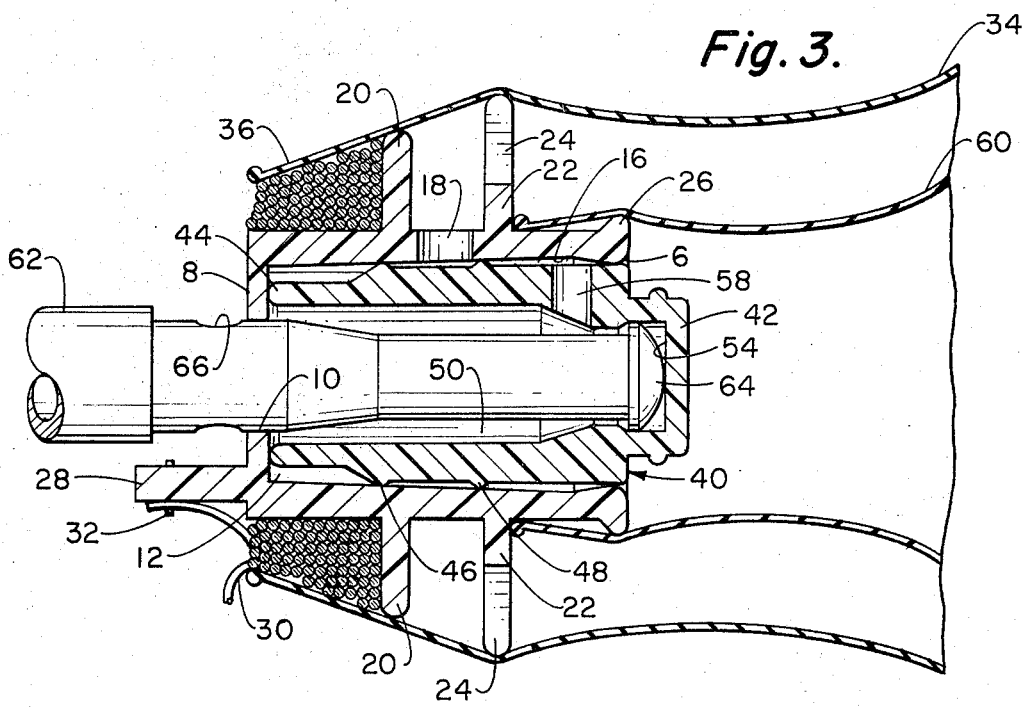
FIG. 3 is a view similar to FIG. 1 showing the valve in the closed position.

The next major component of the valve 2 is a valve slide member 40 of tubular construction having a closed front end 42, and an open rear end 44. The valve member 40 is also of integrally molded plastic of the type which is slightly deformable, and has on its exterior surface spaced sealing lips 46 and 48, which extend about the entire periphery of the exterior of slide member 40 and which are V-shaped in cross-section to engage the inner wall of the bore 16 of valve body member 4. It will be noted that the sealing lips 46 and 48 are so positioned on the exterior of slide member 40 so that the discontinuous wall portion or aperture 18 of valve body member 4 is located therebetween when the slide valve member 40 is in the closed position, as illustrated in FIG. 3.

It will be noted that the slide valve member 40 has an interior bore 50 greater in diameter at the rear end 52, then at the fore end 54, which fore end 54 is provided with an abutment shoulder such as 56 to engage a filling tool or nozzle as will become apparent. At least one port 58 is provided between the front end 42 and the rear end 44 of slide member 40. The thickened or bulbous protrusion of the body member 4 opposite the terminal flange 26, it will be noted, engages the exterior surface of the slide member 40 in gas tight relationship and also prevents movement of slide member 40 to the right (as viewed in FIG. 2), which defines the maximum open position of the valve 2.

Figure 2:
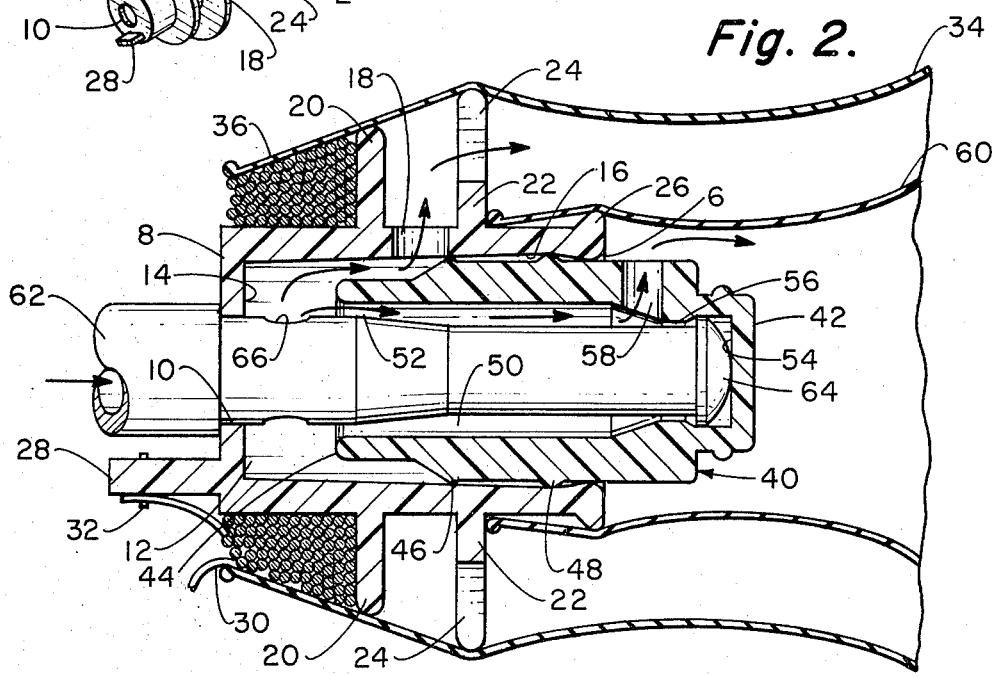
FIG. 2 is an elevational view in cross-section illustrating the open position of the valve, and being associated with two inflatable articles such as balloons.

It will be noted that the second inflatable article or balloon 60 has its neck portion engaging the third or terminal flange 26 of valve body member 4, and slide member 40 is disposed for axial movement within the inner or second balloon 60, as shown in FIG. 2. The mode of utilization of the valve member 2 will now be discussed.

The valve member 2 in the assembled state, and having a length of string wound thereon, has a first balloon 34 put into associative relationship, as shown in FIG. 2. Likewise, a second inner balloon 60 is positioned as shown in FIG. 2, and the balloons are then ready to receive an inflating gas. A fill nozzle such as 62 having connection to a source of gaseous fluid, such as helium, is inserted into the aperture 10 of valve body member 4 to enter the bore 50 of slide member 40 to eventually have its tip 64 engage the closed forward portion 42 to move slide member 40 into the full open position as shown in FIG. 2, this extreme position being defined as earlier indicated by the abuting coaction of sealing lip 48 and the inside wall portion of valve body member 4 opposite the terminal flange 26. It will be noted that the tip 64 of filling nozzle 62 is adapted for cooperative arrangement with interior abutment shouldler 56 for opposite retractive movement of slide member 40, within valve body member 4, as will be described.

When the filling nozzle 62 is inserted as above described, and the valve is positioned as shown in FIG. 2, helium or other inflating gas is introduced specifically through the apertures 66 formed in the nozzle 62, and as represented by the arrows. During the filling operation some of the helium will travel towards the nozzle tip 64 for entry into the bore or passageway 58 communicating with the second or inner balloon 60. At the same time, the passageway communication formed by the aperture 18 and slot 24 allows the gas to simultaneously enter the outer or first balloon 34 equalizing pressure between the inside and outside of the inner balloon 60 during the filling operation. Obviously, filling continues until such time as back pressure is built up within the smaller inner balloon 60 causing more of the helium flow to enter the first balloon 34 until the desired degree of inflation is obtained. The bore 58, aperture 18, and slot(s) 24 are all sized or dimensioned in relation to one another to provide a definite proportion of gas to the inner and outer balloon. The outer diameter of slide member 40 at the open end is also related to the proportioning of the gas between the inner and outer balloon. Various size relationships will give different proportions a feature which may be desirable. As indicated, the tapered bore of body member 4 aids sealing engagement with sliding valve member 40. The forces to move member 40 between the open and closed positions are also decreased due to this relationship. Additionally, this tapered configuration permits ease of assembly of the valve components. Once assembled, the valve may be stored almost indefinitely since no stress is placed on the sealing lips 46 and 48. This absence of stress therefore, prevents deformation of the sealing lips until actual use thereby eliminating the potentialities of gas leakage.

After desired inflation is obtained, the nozzle 62 is retracted to the position shown in FIG. 3. At this time it will be noted that the sliding valve member 40 is retracted to the closed position covering over the port 58 and effectively sealing the aperture 18 by means of the sealing lips 46 and 48 on either side thereof. Continued retraction of the nozzle 62 causes disengagement of the tip 64 with the abutment shoulder 56 thereby allowing complete withdrawal of the nozzle 62 from the valve member 2. The withdrawal of nozzle 62, of course, is aided by the back edge 44 of slide member 40 engaging the interior wall 8 of valve body member 4. When the valve is in the closed position, the back edges 44 abut wall 8 and form an additional seal preventing the gas from escaping from the tube to the atmosphere. So even if the other three sealing lips (46, 48 and lip at 6) fail to seal properly, the inflated balloon will still retain the gas. The inflated balloons are now ready for sale or other end uses, and it will be seen that the dual balloon valve 2 has performed a simple, proficient use to allow effective inflation of the inflatable articles in a simple, direct and straightforward manner.

While specific disclosure has been made to a specific application and embodiment of the invention, other applications and embodiments will make themselves readily apparent to those of ordinary skill in the art and all such modifications and changes will not depart from the spirit and scope of the invention, as disclosed herein and as defined by the appended claims.

We claim:

1. A valve for at least two inflatable articles such as balloons comprising the combination: an open-ended tubular valve body member having spaced first and second peripheral flanges and a third terminal flange; an aperture in the wall of said body member intermediate said first and second flanges, at least one of said first and second flanges being adapted for gas tight association and engagement with a first inflatable article, said third terminal flange being adapted for gas tight association and engagement with a second inflatable article within said first inflatable article, said second flange having at least one discontinuous wall section; a tubular valve slide member longitudinally movable within said body member and said second inflatable article between an advanced open position and a retracted closed position and being in substantially gas tight sliding engagement with a longitudinally extending peripheral sealing area due to the coaction with the inside of said body member, said slide member being closed at its front end and open at its rear end and having at least one port formed therein between the ends thereof which communicates with a point forwardly of said sealing area when said slide member is in its open position; means for restricting relative movement between said body and slide member; and means for obtaining relative movement therebetween.

2. The valve in accordance with claim 1 wherein said second flange is greater in radial dimension than said first flange.

3. The valve in accordance with claim 2 wherein said first and second flanges are greater in radial dimension than said third flange.

4. The valve in accordance with claim 3 wherein said inflatable articles are elastomeric in character to frictionally engage the exterior edges of said first, second and third flanges.

5. The valve in accordance with claim 3 wherein said slide member is cylindrical and the rear portion thereof is of smaller exterior diameter than the forward portion thereof..

6. The valve in accordance with claim 5 wherein the exterior surface of said slide member has at least two spaced sealing lips for engagement with the inside bore of said body member.

7. The valve in accordance with claim 6 wherein said sealing lips are located so that when said slide member is in the closed position, said aperture in the wall of said body member intermediate said first and second flanges is also intermediate said sealing lips.

8. The valve in accordance with claim 7 wherein said second flange is provided with opposed openings and said body member has a tapered bore.

9. The valve in accordance with claim 8 wherein said sealing lips have an inverted V-shape in cross-section configuration.

10. The valve in accordance with claim 8 wherein the terminal portion of said body member opposite said third terminal flange is adapted to engage the exterior cylindrical surface of said slide member in gas tight relationship.

11. The valve in accordance with claim 10 wherein means for restricting relative movement between said body and slide members comprises the cooperation of the rear edge of said slide member abutting the interior closed rear portion of said valve body member.

12. The valve in accordance with claim 11 wherein said rear edge abutting said interior closed rear portion of said valve body member forms a gas-tight sealing area and said means for obtaining relative movement between said body and slide members comprises an interior abutment shoulder located on the interior of said slide member adjacent the forward end thereof.

13. The valve in accordance with claim 12 wherein said body and slide members are formed of molded plastic of slightly deformable character.

14. The valve in accordance with claim 13 which additionally includes a tab integrally formed with the rear wall portion of said valve body member.

15. The valve in accordance with claim 14 including a length of string secured to said tab and wound on the exterior surface of said valve body member between the end wall and said first flange.

* * * * *